United States Patent
Bodum

(10) Patent No.: US 8,695,486 B2
(45) Date of Patent: Apr. 15, 2014

(54) PLUNGER-FILTER BEVERAGE-MAKING MACHINE WITH A CLOSABLE POURING OPENING

(75) Inventor: Jørgen Bodum, Meggen (CH)

(73) Assignee: Pi-Design AG, Triengen (CH)

( * ) Notice: Subject to any disclaimer, the term of this patent is extended or adjusted under 35 U.S.C. 154(b) by 380 days.

(21) Appl. No.: 12/997,202

(22) PCT Filed: May 8, 2009

(86) PCT No.: PCT/CH2009/000152
§ 371 (c)(1),
(2), (4) Date: Dec. 9, 2010

(87) PCT Pub. No.: WO2009/149568
PCT Pub. Date: Dec. 17, 2009

(65) Prior Publication Data
US 2011/0088561 A1      Apr. 21, 2011

(30) Foreign Application Priority Data
Jun. 10, 2008   (CH) ..................................... 0874/08

(51) Int. Cl.
*A47J 31/20*    (2006.01)
*A47J 31/06*    (2006.01)

(52) U.S. Cl.
USPC ............................................. 99/297; 99/298

(58) Field of Classification Search
None
See application file for complete search history.

(56) References Cited

U.S. PATENT DOCUMENTS

| 5,240,145 | A | 8/1993 | Hogberg |
| 6,079,316 | A | 6/2000 | Barden et al. |
| 6,295,920 | B1 * | 10/2001 | Barden et al. .................. 99/297 |
| 6,422,133 | B1 | 7/2002 | Brady |
| 6,755,120 | B1 * | 6/2004 | Lin .............................. 99/323.3 |
| 6,997,104 | B1 | 2/2006 | Lin |
| 7,578,231 | B2 * | 8/2009 | Liu ................................ 99/297 |
| 2003/0226859 | A1 | 12/2003 | Takagawa |
| 2006/0021524 | A1 | 2/2006 | Liu |

FOREIGN PATENT DOCUMENTS

| CA | 2 255 790 A1 | 7/1999 |
| DE | 540 273 C | 3/1935 |
| DE | 296 11 746 U1 | 11/1997 |
| EP | 1 230 882 A2 | 8/2002 |

(Continued)

OTHER PUBLICATIONS

Japan Office Action dated Mar. 19, 2013 issued in Japanese Application No. 2011-512800.

(Continued)

*Primary Examiner* — Henry Yuen
*Assistant Examiner* — Thomas Ward
(74) *Attorney, Agent, or Firm* — Sughrue Mion, PLLC

(57) ABSTRACT

The invention discloses a plunger-filter beverage-making machine with a lid which can be closed by a valve. The beverage-making machine has a vessel (2), a lid (3) and a filter piston (4) which can be vertically displaced in the vessel and has a piston rod (41). The lid (3) contains a pouring opening (37) which can be closed by means of an elongate lever (33) which extends transverse to the piston rod. To this end, the lever is mounted on the lid such that it can pivot about a horizontal axis. The lever has, in the region of its front end, a closure body (36) in order to close the pouring opening and, in the region of its rear end, an operating region (331) in order to pivot the lever by virtue of pressure exerted by a finger of a user.

22 Claims, 4 Drawing Sheets

(56) References Cited

FOREIGN PATENT DOCUMENTS

| | | |
|---|---|---|
| JP | 3012251 U | 6/1995 |
| JP | 11-240552 A | 9/1999 |
| JP | 2001-151257 A | 6/2001 |
| JP | 2002-238760 A | 8/2002 |
| JP | 2004-8513 A | 1/2004 |

OTHER PUBLICATIONS

International Preliminary Report on Patentability and Written Opinion dated May 8, 2009.

* cited by examiner

PLUNGER-FILTER BEVERAGE-MAKING MACHINE WITH A CLOSABLE POURING OPENING

TECHNICAL FIELD

The present invention relates to a beverage-maker having an upwardly open vessel and a filter piston arranged displaceably therein. Beverage-makers of this type are generally referred to as plunger-filter beverage-makers or as "French Press" beverage-makers. Beverage-makers of this type can be used to prepare coffee, tea, etc. or to froth up milk, for example.

PRIOR ART

"French Press" coffee makers have long been known from the prior art. These normally comprise a cylindrical glass vessel, in which a filter piston is displaceably arranged. The filter piston comprises a piston rod, to whose lower end a plunger-filter having a fine wire or plastics mesh is attached. The piston rod is passed through a lid which covers the vessel in the upward direction.

In order to prepare coffee, for instance, ground coffee beans are poured into the vessel and poured over with hot water. The mixture is left to stand for a few minutes. Next the filter piston is inserted into the vessel and pressed down. The plunger-filter hereupon separates the ready-to-drink coffee from the spent coffee powder.

For the pouring of the coffee, a beak-like spout is normally configured on the upper rim of the vessel. The lid generally has as spray protection a circumferential skirt, which extends inside the vessel. In the skirt (generally slit-shaped) apertures are present to enable the coffee to be poured out through the apertures by means of the spout.

In order to avoid a situation in which a user, when pressing down the plunger-filter, can be scalded by spurting hot liquid, the apertures of the skirt are normally turned away from the spout as the filter piston is pressed down and are only brought into the region of the spout immediately before pouring. However, a user can easily forget this. There is therefore always a certain danger that either hot liquid spurts out because the user has forgotten to turn the apertures away from the spout before pressing down, or that the ready coffee is spilt because the user, after pressing down, forgets to bring the apertures back into overlap with the spout and the coffee therefore escapes unchecked between the vessel wall and the lid.

U.S. Pat. No. 6,295,920 discloses a plunger-filter beverage-maker, the spout of which is covered with a pivotable flap. This pivots upward during pouring by virtue of the pressure of the escaping coffee and thus frees the spout. Such a flap is unsatisfactory, however, since the flap, during the pouring, is necessarily wetted by the coffee and the flow of the coffee thereupon changes, so that there is a danger of coffee dripping down from the spout during pouring, or subsequently.

REPRESENTATION OF THE INVENTION

An object of the present invention is thus to define a plunger-filter beverage-maker in which these problems are avoided, which thus ensures spray protection as the plunger-filter is pressed down, combined with high operating safety, without the risk of subsequent dripping. A further object of the invention is to define a beverage-maker of this type in which heat losses through the lid are minimized.

This object is achieved by a beverage-maker having the features of claim 1. Advantageous embodiments are defined in the dependent claims.

The present invention thus provides a beverage-maker having the following features:
- an upwardly open, substantially cylindrical vessel made of a heat-resistant material, in particular glass, having a vessel bottom and a circumferential side wall;
- a filter piston vertically displaceable in the vessel, having a piston rod to whose upper end an actuating element, for example in the form of a knob, is attached, and to whose lower end a plunger-filter is attached, which latter is suitable for allowing the passage of liquid and, at the same time, for retaining solids; and
- a lid, which is passed through by the piston rod and has a top wall which at least partially covers the vessel in the upward direction and which, jointly with the vessel, delimits a vessel interior.

On the lid or on the vessel, outside the vessel interior, a spout is configured. The lid has a pouring opening, which is disposed between the piston rod and the spout and breaches the top wall and which forms a connection between the vessel interior and the spout in order to pour liquid out of the vessel through the pouring opening by means of the spout. An elongated lever, extending above the top wall transversely to the piston rod, is attached to the lid pivotably about a horizontal axis. The lever has a closure body in the region of its front end for closing the pouring opening, and the lever has an actuating region in the region of its rear end for pivoting the lever, by virtue of pressure exerted by a finger of the user, from a first position, in which the closure body closes the pouring opening, into a second position, in which the closure body frees the pouring opening.

In this way, a valve, which can be opened and closed very easily in a purposeful manner, is configured in the lid. The vessel interior is completely closed, as long as the user does not deliberately actuate the lever in order to open the valve. An operating error, which could lead to splashing of the drink as the filer piston is pushed down, is thereby practically precluded. It is ensured, moreover, that heat is not unnecessarily lost through the pouring opening.

Heat-insulated coffee pots, whose lid contains a valve which can be opened by means of a lever mechanism by pressure onto an actuating element located above the handle of the pot, are known from U.S. Pat. No. 6,755,120 or U.S. Pat. No. 6,997,104. However, these coffee pots are intended for filter coffee machines, in which coffee powder is filled into a filter disposed above the pot and is poured over with hot water which extracts the coffee and makes its way through the filter into the below-situated coffee pot as the finished drink. The valve must here fulfill a dual function, namely, on the one hand, to ensure the inflow as the coffee is brewed and, on the other hand, to enable the finished drink to be poured. These valves are consequently of relatively complicated design, while the valve of the present invention, in comparison thereto, is very simply constructed. Moreover, these solutions are not transferable to plunger-filter coffee pots, since the valve, in the known pots, is arranged centrally and would not allow a central piston rod to pass through.

By the term "substantially cylindrical vessel" is meant that the vessel, over a considerable part of its length, has a cylindrical basic shape. The vessel can widen, however, for example in its upper rim region. The spout is preferably configured on the lid. If the top wall of the lid is disposed sufficiently far within the vessel, however, it is also conceivable to configure the spout on the vessel itself. The vessel can optionally be held in a holder which at least partially encompasses the vessel and has a handle, as has long been known per se in a wide variety of variants. However, the vessel can also itself have an integrated handle, which can be produced, for example, integrally with the glass or plastics vessel.

Preferably, the lever is spring-loaded in the direction of its first position in order to ensure that the pouring opening is closed as long as the lever is not deliberately actuated. Instead, the lever can also be configured, however, such that the pouring opening is closed solely due to the weight of the lever and of the closure body, as long as no pressure is applied to the actuating region.

Preferentially, for the generation of the spring force, a compression spring is present. This is preferably disposed in a rear region of the lid, facing away from the spout, between the lever and the below-situated top wall in order to subject the lever to a spring force in the direction of its first position. However, such a spring can also be disposed in a region of the lever, adjacent to the spout, between the lever and a lid region disposed above the lever.

Insofar as the compression spring is disposed in the rear lid region, a cup-shaped depression (spring seat), extending towards the vessel interior, is preferably configured in the top wall, into which depression the compression spring extends. In this way, the compression spring is secured against lateral displacements or even against falling out, and a sufficiently large spring length for the required spring travel is enabled.

In order to pass the piston rod through the lid, the lever preferably has a through opening, through which the piston rod extends. The lever can instead, however, be led around the side of the piston rod.

The lever is preferably mounted on the lid, such that it can be pivoted horizontally, by means of bearing elements directly connected to the top wall. The lever preferably has a bearing shaft extending transversely to the longitudinal direction of the lever, for example in the form of a continuous pin, or two coaxially arranged, bearing journals extending outward transversely to the longitudinal direction of the lever. For fastening, the lid then preferably has two mutually opposing, jaw-shaped bearing elements for the reception of the bearing shaft or bearing journals, and the bearing shaft or bearing journals, in surmounting an elastic spring force, can be clicked into the bearing elements. Simple manufacture and maintenance is thereby ensured. However, the lever can also be pivotably mounted on the lid in another way, for example via a shaft which is arranged centrally in an opening in the lever and is inserted in a single, central bearing element, as is known per se.

In order to ensure an effective sealing of the pouring opening, the closure body is preferably made of a material which is softer (on the Shore A scale) than the material of the rest of the lever. In particular, the closure body can consist of silicone plastic. It is preferably inserted in an opening or recess in the region of the front end of the lever, but can also, for example, be produced jointly with the rest of the lever in a two-component injection molding process. Where appropriate, the closure body can also consist of the same material as the rest of the lever and be produced integrally therewith, particularly when, by the shaping of closure body and opening, an adequate seal is already ensured.

The lid preferably has a circumferential skirt, which extends vertically downward and extends into the vessel interior, as is already at present generally the case with the lids of commercially available plunger-filter coffee pots. In order to create an effective seal between the vessel and the lid, on the outer side of the skirt there is preferably disposed a circumferential sealing element, which bears sealingly against the inner side of the side wall of the vessel. The sealing element can assume, in particular, the shape of a ring made of a softer material, for example silicone plastic, than the rest of the lid material, and can have a sealing lip extending radially outward. In order to facilitate the insertion of the sealing element, the vessel can widen slightly at the upper rim.

The top wall of the lid, which delimits the vessel in the upward direction, is preferably configured substantially flat. In order to retain in the region of the pouring opening liquid running back from the spout, in a region surrounding the pouring opening there can be configured an upwardly protruding retaining web, which, starting from the spout, extends partially around the pouring opening.

The lid is preferably of two-part construction, i.e. the lid preferably comprises a lid bottom part, which forms the top wall delimiting the vessel interior, and a separately configured lid top part, which at least partially covers the lid bottom part and the lever. In order to guide the piston rod in as precise and vertically stable a manner as possible, on one of the lid parts, selected from lid bottom part and lid top part, there is then preferably configured a cylindrical guide sleeve, which is held in the other lid part such that the guide sleeve is secured against a lateral tilting motion. The guide sleeve can be latched, in particular, to the other lid part.

A simple design results if the guide sleeve is configured integrally with the lid top part and extends vertically downward into the vessel interior through the top wall delimiting the vessel interior, and if a releasable latching connection, for example in the form of latching cams configured on the outer side of the guide sleeve and reaching under the top wall of the lid bottom part, is configured between the guide sleeve and the top wall.

BRIEF DESCRIPTION OF THE DRAWINGS

Preferred embodiments of the invention are described below with reference to the drawings, in which.

DESCRIPTION OF PREFERRED EMBODIMENTS

In FIGS. 1 to 6, a preferred illustrative embodiment of a beverage-maker according to the invention, in the form of a plunger-filter coffee pot, is shown in various representations.

Figure 1:
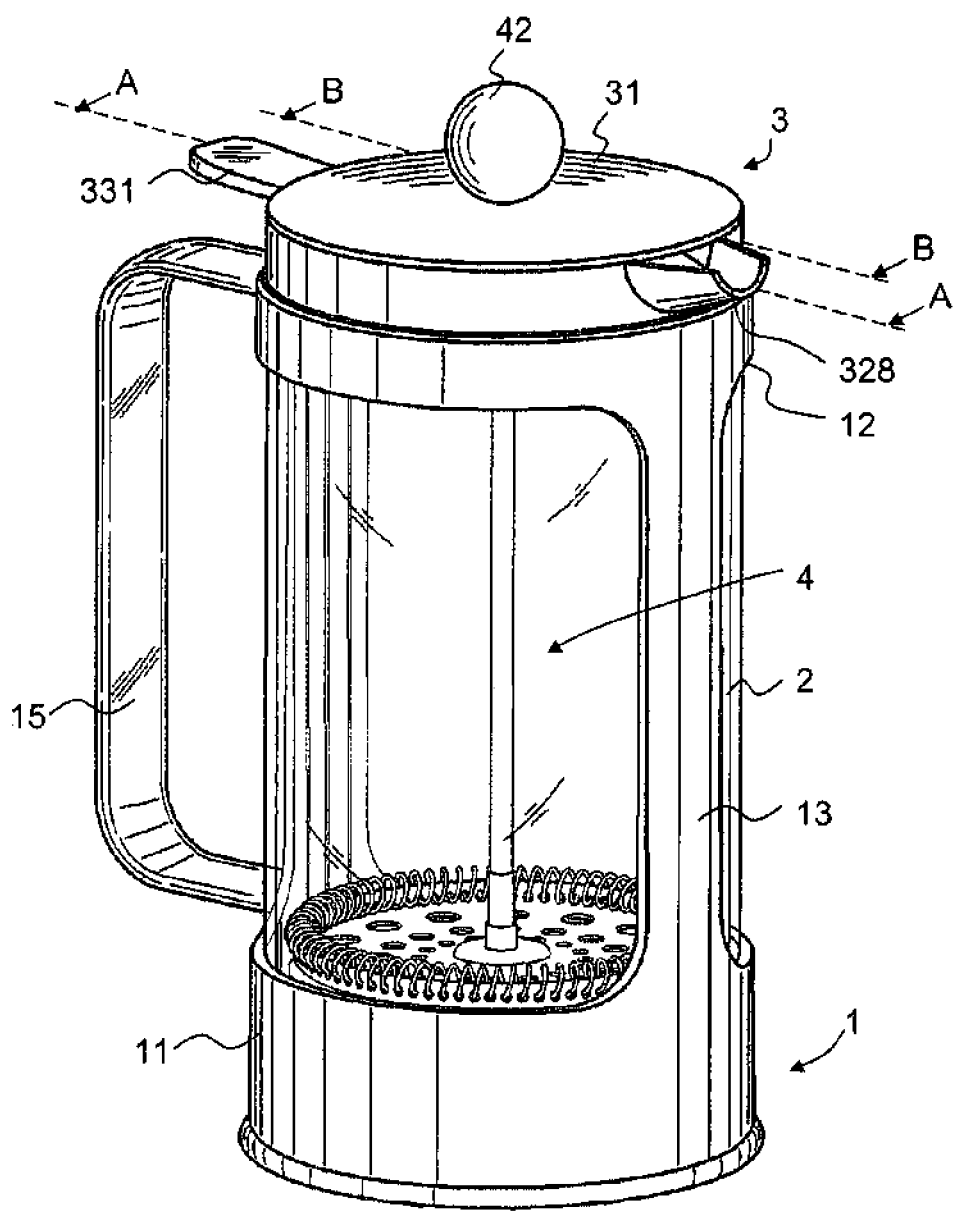
FIG. 1 shows a perspective view of a "French Press" beverage-maker.

The beverage-maker comprises a holder 1 made of plastic, a substantially cylindrical vessel 2 held therein, a lid 3, and a filter piston 4. In FIG. 1, the vessel is represented as transparent and consists, in particular, of heat-resistant glass; however, it can also consist of plastic or metal, for example.

The holder 1 comprises an upper holding ring 12, encompassing the side wall 21 of the vessel, and a lower holding ring 11, which merges into a base breached in the downward direction by a circular central opening. The holding rings are connected to each other by two longitudinal struts 13 extending in the longitudinal direction of the vessel. Likewise connected to the holding rings 11, 12 is a handle 15 for grasping of the beverage-maker.

The upwardly open vessel 2 consists of a slightly upwardly arched bottom 22 and a circumferential side wall 21 of cylindrical basic shape. Unlike in most coffee makers of the prior art, there is no spout configured in the side wall. The side wall ends approximately flush with the upper holding ring 12 of the holder 1.

Figure 2:
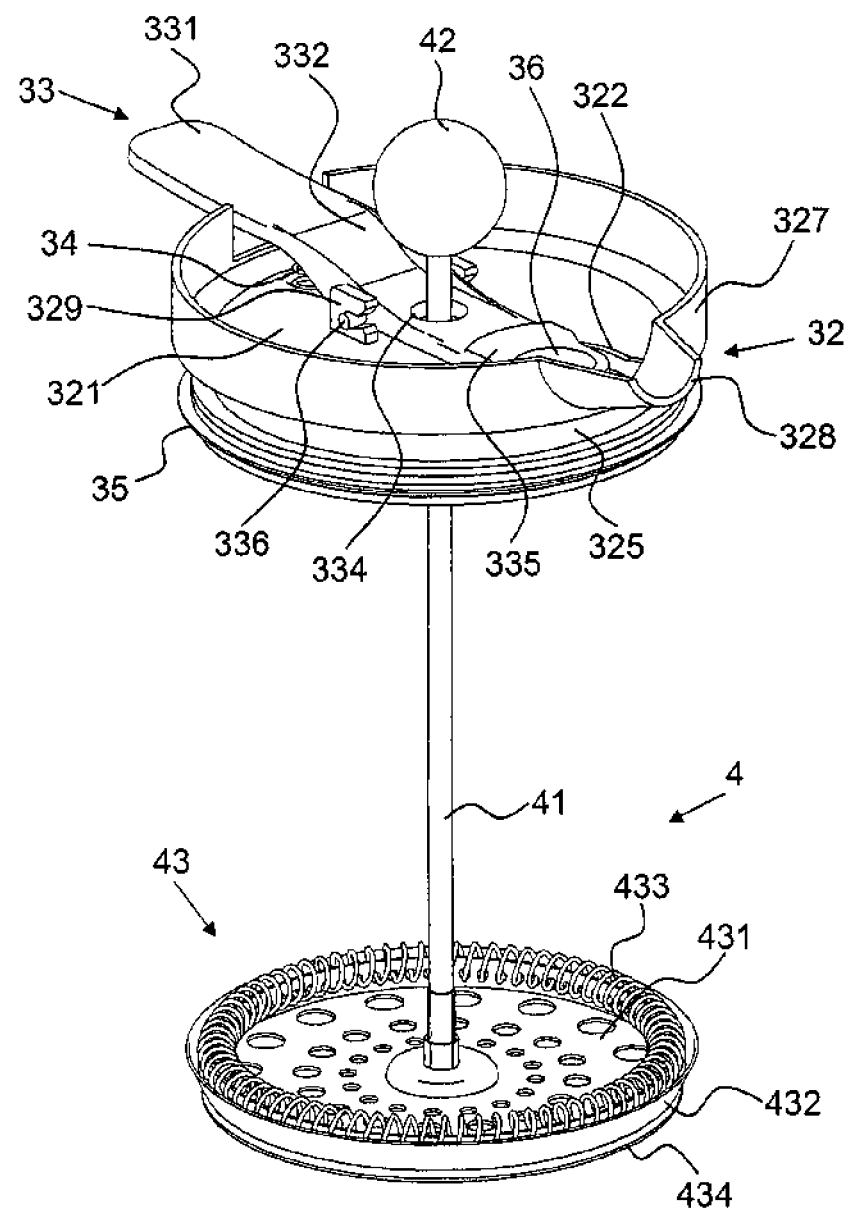
FIG. 2 shows a perspective view of the lid (in part) and of the filter piston of the beverage-maker of FIG. 1.
Figure 3:
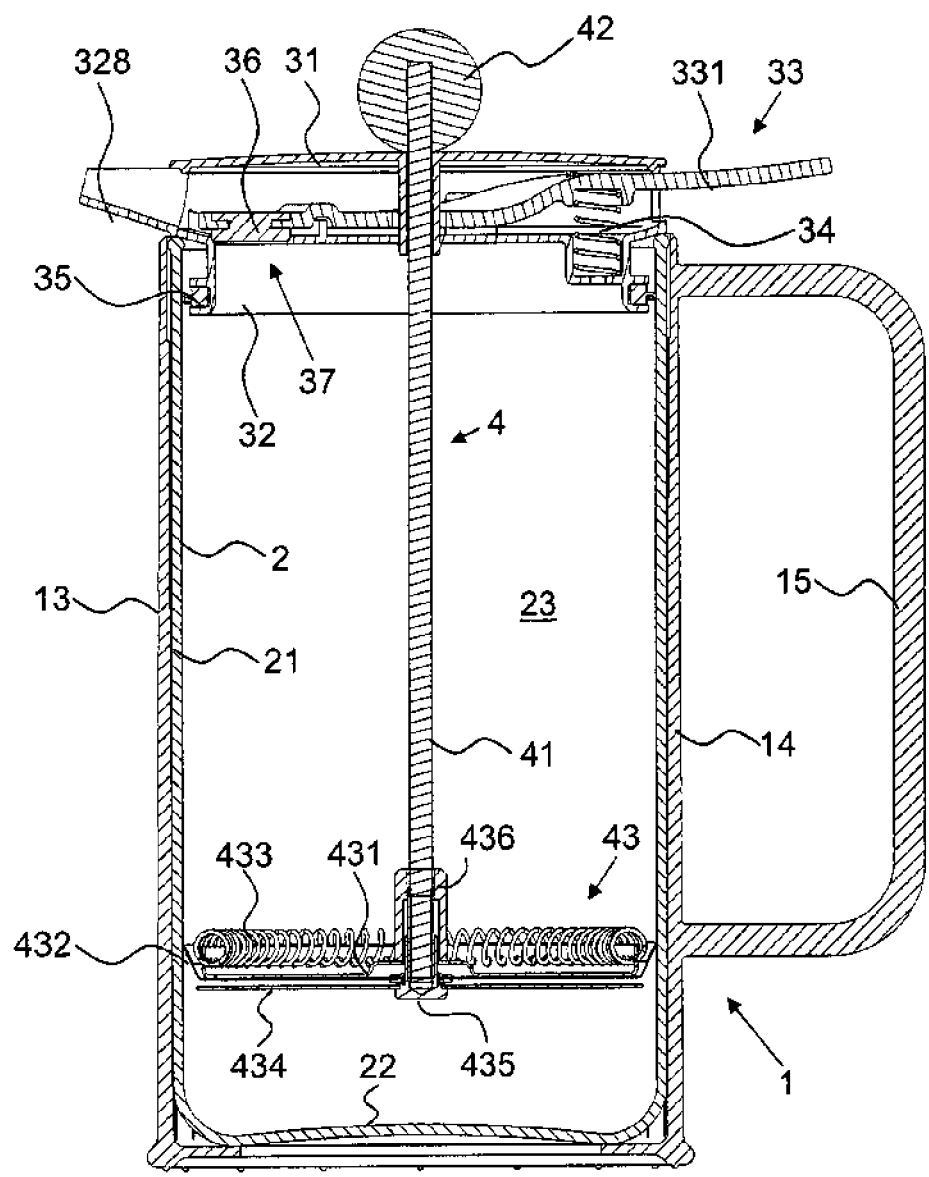
FIG. 3 shows a central longitudinal section in the plane A-A through the beverage-maker of FIG. 1.
Figure 4:
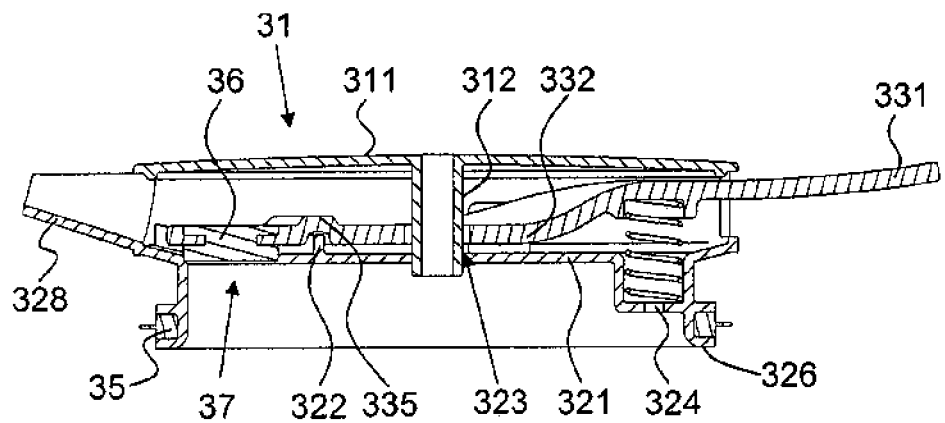
FIG. 4 shows a central longitudinal section in the plane A-A through lid of the beverage-maker of FIG. 1.
Figure 5:
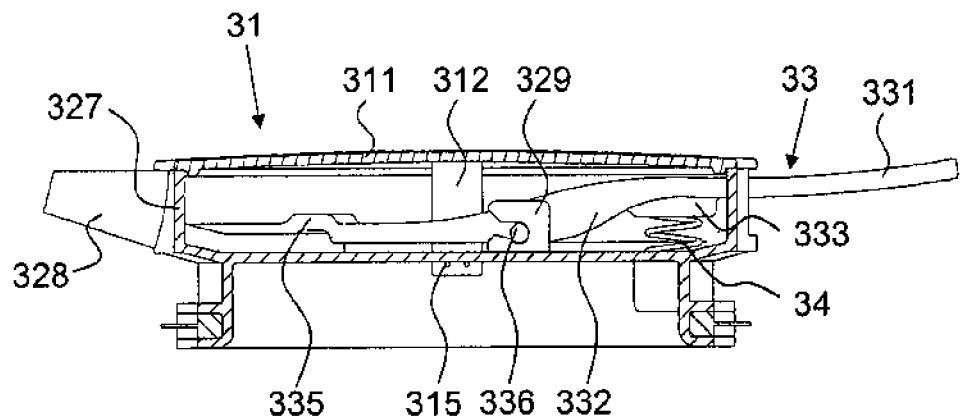
FIG. 5 shows a non-central longitudinal section in the plane B-B through lid of the beverage-maker of FIG. 1.
Figure 6:
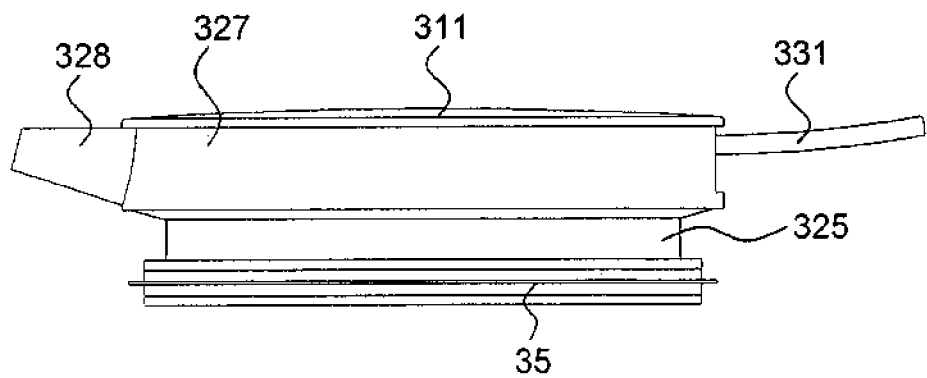
FIG. 6 shows a side view of the lid of FIGS. 4 and 5.

Inserted in the vessel 2 is the lid 3. This is constructed in two parts and comprises a lid bottom part 32 and a lid top part 31. In FIG. 2, the lid top part is not represented. The lid bottom part 32 has a substantially flat top wall 321, which largely covers the upper vessel opening and, together with the vessel 2, delimits a vessel interior 23. Configured in the top wall 321 is a pouring opening 37, which is discernible in FIGS. 2, 3 and 4 and is there sealingly closed by a closure body 36. To the rear, the pouring opening 37 is surrounded by a retaining web 322, which on both sides ends at a beak-like spout 328 and thus prevents liquid which might run back from the spout in the direction of the pouring opening from getting into the rest of the lid region.

Starting from the top wall 321, extending upward on the outer margin thereof, is a cylindrical side wall 327, which is interrupted by the spout 328 and by a recess for a lever 33. Likewise starting from the top wall 321, a circumferential, cylindrical skirt 325 of somewhat smaller diameter extends downward into the vessel. Extending outward from the skirt is a pair of annular, mutually spaced webs, which form a seat 326 for a circumferential, annular seal 35 having a radially outwardly protruding sealing lip. Hence, on the one hand, the lid 3, having been inserted, is held relatively firmly in the vessel 2 and, on the other hand, a seal is formed between the vessel and the lid, which seal prevents liquid from possibly escaping between the vessel and the lid.

The elongated lever 33 is fastened pivotably to the lid bottom part 32. To this end, it has on a central main portion 332 two laterally protruding, coaxial, horizontal bearing journals 336, which are clicked into two jaw-shaped bearing elements 329, which are open to the fore, i.e. in the direction of the spout 328. The bearing elements 329 are configured integrally with the lid bottom part. The jaw opening is at the front end somewhat smaller than the journal diameter, and the bearing elements are of slightly elastic configuration in order to allow the clicking engagement.

In the direction of its front, spout-facing end, the lever 33 first has a contour which is pre-arched upward in the style of an arc in order to surmount the retaining web 322. In the following, front end region of the lever there is configured a round opening, in which the closure body 37 is inserted. While the lever 33 itself, just like the rest of the lid, is made of an impact-resistant and relatively hard plastic such as, for example, polypropylene, the closure body 37 consists of a relatively soft material, for example silicone plastic, in order to obtain a good sealing effect.

At its rear end facing away from the spout, the lever 33 projects with an actuating region 331 from the lid bottom part 32 and can be pivoted slightly about its horizontal pivot axis by virtue of downward pressure exerted by the thumb of the user, so that the closure body 36 is raised from the pouring opening 37 and frees the pouring opening.

By means of a pressure-operated helical spring 34, the lever is preloaded into the closing position. The helical spring 34 is disposed in the rear region of the lever, facing away from the spout, but still within the side wall 327 of the lid bottom part. It is accommodated in a cup-shaped depression 324 in the top wall 331, which depression allows a greater spring travel than would be possible without such a depression. In the upward direction, it reaches into an annular spring seat 333 on the bottom side of the lever 33. By virtue of the depression 324 and the spring seat 333, the spring is secured against lateral displacements or even against jumping out.

The lid top part 31 covers with its upper top wall 311 the upper margin of the side wall 327 of the lid bottom part 32. Extending vertically downward from a central opening in the upper top wall is a guide sleeve 312, which is produced integrally with the upper top wall and in which the piston rod 41 of the filter piston 4 is guided. The lever 33 and the lower top wall 321 of the lid bottom part 32 respectively have a through opening, through which the guide sleeve 312 extends. The through opening in the lever 33 is here sufficiently large not to hinder the pivot motion of the lever. The through opening in the lower top wall 321, by contrast, fits precisely with the guide sleeve 312. In the region of the lower end of the guide sleeve, a plurality of flat, spherical-segment-shaped latching cams 315 are configured on the surface of the guide sleeve, which, following the insertion of the guide sleeve, form a releasable latching connection between the guide sleeve 312 and the lid bottom part 32. The guide sleeve is thereby secured at two different vertical locations against lateral displacements, and thus against tilting motions. Hence, on the one hand, the vertical guidance of the piston rod 41 is improved, and, on the other hand, the risk of breaking of the connection between the upper top wall 311 and the guide sleeve 312 is reduced.

The filter piston has at the upper end of the piston rod 41 a knob 42 as the actuating element. At the lower end, a plunger-filter 43 of a construction which is known per se is attached to the piston rod. The plunger-filter comprises an upper perforated plate 431, which at its upper margin is raised and is provided with a multiplicity of small openings. Through these openings, a toroidal wire coil 433 is threaded. A fine wire mesh 432 rests on the bottom side of the perforated plate and is drawn upward over the wire coil 433. The wire mesh is fixed in the downward direction with a star-like or perforated-plate-like fixing plate 434 placed beneath the wire mesh parallel to the perforated plate. With a common fixing screw 435, which engages in a check nut 436 (represented only in FIG. 3), the perforated plate 431, the wire mesh 432 and the fixing plate 434 are secured on the piston rod.

The invention is not, of course, restricted to the above example and a large number of modifications are possible. In particular, for instance, the lever can also be designed differently in terms of its shape and arrangement. For example, the actuating region does not need to be disposed radially outside the lid bottom part, but can also be situated within the lid bottom part and be accessible from above through a cutout or opening in the lid top part. Of course, the plunger-filter can be configured in a different manner than represented above, for example with a plastics mesh cast into a plastics frame, as is known per se from the prior art. Instead of the vessel holder represented in the drawings, any other holder may also be used, or the holder can be wholly dispensed with if, for example, the vessel has a molded-on handle. A large number of further modifications are possible. In particular, the above-described embodiments of the lever and of the piston guide can, self-evidently, advantageously be used independently of each other and independently of further features.

Reference Symbol Table 1 holder
11 lower ring
12 upper ring
13, 14 longitudinal strut
15 handle
2 glass vessel 21 side wall
22 bottom
3 lid
31 lid top part
311 top wall
312 guide sleeve
315 latching cam
32 lid bottom part
321 base
322 retaining web
323 opening
324 depression
325 skirt
326 seal seat
327 side wall
328 spout
329 shaft mount
33 closing lever
331 actuating region
332 main portion
333 spring seat
334 opening
335 curved region
336 shaft
34 compression spring
35 sealing ring
36 stopper
37 pouring opening
4 plunger filter
41 piston rod
42 actuating knob
43 filter plate
431 base plate
432 wire mesh
433 wire coil
434 fixing plate
435 fixing screw
436 check nut

The invention claimed is:

1. A beverage-maker, comprising
an upwardly open, substantially cylindrical vessel having a vessel bottom and a circumferential side wall;
a filter piston vertically displaceable in the vessel, having a piston rod to whose upper end a grip element is attached, and to whose lower end a plunger-filter is attached, which plunger-filter is suitable for allowing the passage of liquid and, at the same time, for retaining solids; and
a lid, which is passed through by the piston rod and has a top wall which at least partially covers the vessel in an upward direction and which, jointly with the vessel, delimits a vessel interior, wherein the top wall has a first opening and a second opening, the first opening being a through opening, through which the piston rod extends, and the second opening being a pouring opening,
wherein, on the lid or on the vessel, outside the vessel interior, a spout is configured, wherein the pouring opening is disposed between the through opening and the spout and forms a connection between the vessel interior and the spout in order to pour liquid out of the vessel through the pouring opening by means of the spout, and
wherein an elongated lever, extending transversely to the piston rod, is attached to the lid above the top wall pivotably about a horizontal axis, the elongated lever having a closure body in a region of its front end for closing the pouring opening, and the elongated lever having an actuating surface in a region of its rear end, facing away from the pouring opening, in order to pivot the elongated lever, by virtue of pressure exerted by a finger of a user, from a first position, in which the closure body closes the pouring opening, into a second position, in which the closure body frees the pouring opening.

2. The beverage-maker as claimed in claim 1, wherein the elongated lever is spring-loaded in the direction of its first position.

3. The beverage-maker as claimed in claim 2, having a compression spring which is disposed in a region of the lid, facing away from the spout, between the elongated lever and the top wall in order to subject the elongated lever to a spring force in the direction of its first position.

4. The beverage-maker as claimed in claim 3, wherein a cup-shaped depression, extending towards the vessel interior, is configured in the top wall, into which depression the compression spring extends.

5. A beverage-maker, comprising
an upwardly open, substantially cylindrical vessel having a vessel bottom and a circumferential side wall;
a filter piston vertically displaceable in the vessel, having a piston rod to whose upper end a grip element is attached, and to whose lower end a plunger-filter is attached, which plunger-filter is suitable for allowing the passage of liquid and, at the same time, for retaining solids; and
a lid, which is passed through by the piston rod and has a top wall which at least partially covers the vessel in an upward direction and which, jointly with the vessel, delimits a vessel interior,
wherein, on the lid or on the vessel, outside the vessel interior, a spout is configured, wherein the lid has a pouring opening, which is disposed between the piston rod and the spout in the top wall and which forms a connection between the vessel interior and the spout in order to pour liquid out of the vessel through the pouring opening by means of the spout, and
wherein an elongated lever, extending transversely to the piston rod, is attached to the lid above the top wall pivotably about a horizontal axis, the elongated lever having a closure body in a region of its front end for closing the pouring opening, and the elongated lever having an actuating surface in a region of its rear end, facing away from the pouring opening, in order to pivot the elongated lever, by virtue of pressure exerted by a finger of a user, from a first position, in which the closure body closes the pouring opening, into a second position, in which the closure body frees the pouring opening,
wherein the elongated lever has a through opening, through which the piston rod extends.

6. The beverage-maker as claimed in claim 1, wherein the lever has a bearing shaft extending transversely to the longitudinal direction of the elongated lever, or two coaxially arranged bearing journals extending transversely to the longitudinal direction of the elongated lever, wherein the lid has two mutually opposing, jaw-shaped bearing elements for the reception of the bearing shaft or bearing journals, and wherein the bearing shaft or bearing journals, in surmounting an elastic spring force, can be clicked into the bearing elements.

7. The beverage-maker as claimed in claim 1, wherein the closure body is made of a material which is softer than the material of the rest of the elongated lever.

8. The beverage-maker as claimed in claim 1, wherein the lid has a circumferential skirt, which extends vertically downward and extends into the vessel interior, and on whose outer side there is disposed a circumferential sealing element, which bears sealingly against the inner side of the side wall of the vessel.

9. The beverage-maker as claimed in claim 1, wherein the top wall of the lid is configured substantially flat, and in a region surrounding the pouring opening there is configured an upwardly protruding retaining web, which, starting from the spout, extends partially around the pouring opening in order to retain in the region of the pouring opening liquid running back from the spout.

10. The beverage-maker as claimed in claim 1, wherein the lid comprises a lid bottom part, which forms the top wall delimiting the vessel interior, and wherein the lid comprises a separately configured lid top part, which at least partially covers the lid bottom part and the elongated lever, and wherein on one of the lid parts, selected from lid bottom part and lid top part, there is configured a cylindrical guide sleeve for the piston rod, which is held in the other lid part such that the guide sleeve is secured against a lateral tilting motion.

11. The beverage-maker as claimed in claim 10, wherein the guide sleeve can be latched to the other lid part.

12. The beverage-maker as claimed in claim 10, wherein the guide sleeve is configured integrally with the lid top part and extends vertically downward into the vessel interior through the top wall delimiting the vessel interior, and wherein a releasable latching connection is configured between the guide sleeve and the top wall.

13. The beverage-maker as claimed in claim 11, wherein the guide sleeve is configured integrally with the lid top part and extends vertically downward into the vessel interior through the top wall delimiting the vessel interior, and wherein a releasable latching connection is configured between the guide sleeve and the top wall.

14. A beverage-maker, comprising
an upwardly open, substantially cylindrical vessel having a vessel bottom and a circumferential side wall; and
a lid, which has a top wall which at least partially covers the vessel in an upward direction and which, jointly with the vessel, delimits a vessel interior,
wherein, on the lid or on the vessel, outside the vessel interior, a spout is configured,
wherein the lid has a pouring opening, which is disposed in the top wall and which forms a connection between the vessel interior and the spout in order to pour liquid out of the vessel through the pouring opening by means of the spout, and
wherein an elongated lever, is attached to the lid above the top wall pivotably about a horizontal axis, the elongated lever having, in the region of its front end, a closure body for closing the pouring opening, and the elongated lever having, in the region of its rear end, facing away from the pouring opening, an actuating surface in order to pivot the elongated lever, by virtue of pressure exerted by a finger of the user, from a first position, in which the closure body closes the pouring opening, into a second position, in which the closure body frees the pouring opening, the horizontal axis being arranged between the closure body and the actuating surface of the elongated lever.

15. The beverage-maker as claimed in claim 14, wherein the elongated lever is spring-loaded in the direction of its first position.

16. The beverage-maker as claimed in claim 15, having a compression spring which is disposed in a region of the lid, facing away from the spout, between the elongated lever and the top wall in order to subject the elongated lever to a spring force in the direction of its first position.

17. The beverage-maker as claimed in claim 16, wherein a cup-shaped depression, extending towards the vessel interior, is configured in the top wall, into which depression the compression spring extends.

18. The beverage-maker as claimed in claim 14, wherein the lever has a bearing shaft extending transversely to the longitudinal direction of the elongated lever, or two coaxially arranged bearing journals extending transversely to the longitudinal direction of the elongated lever, wherein the lid has two mutually opposing, jaw-shaped bearing elements for the reception of the bearing shaft or bearing journals, and wherein the bearing shaft or bearing journals, in surmounting an elastic spring force, can be clicked into the bearing elements.

19. The beverage-maker as claimed in claim 14, wherein the closure body is made of a material which is softer than the material of the rest of the elongated lever.

20. The beverage-maker as claimed in claim 14, wherein the lid has a circumferential skirt, which extends vertically downward and extends into the vessel interior, and on whose outer side there is disposed a circumferential sealing element, which bears sealingly against the inner side of the side wall of the vessel.

21. The beverage-maker as claimed in claim 14, wherein the top wall of the lid is configured substantially flat, and in a region surrounding the pouring opening there is configured an upwardly protruding retaining web, which, starting from the spout, extends partially around the pouring opening in order to retain in the region of the pouring opening liquid running back from the spout.

22. The beverage-maker as claimed in claim 14, wherein the lid comprises a lid bottom part, which forms the top wall delimiting the vessel interior, and wherein the lid comprises a separately configured lid top part, which at least partially covers the lid bottom part and the elongated lever.

\* \* \* \* \*